US012652251B2

(12) United States Patent
Eran et al.

(10) Patent No.: US 12,652,251 B2
(45) Date of Patent: Jun. 9, 2026

(54) MULTIPLANE LOAD BALANCING

(71) Applicant: MELLANOX TECHNOLOGIES, LTD., Yokneam (IL)

(72) Inventors: Haggai Eran, Yokneam Ilit (IL); Omer Shabtai, Tel Aviv (IL); Gil Bloch, Zichron Ya'acov (IL); Michael Avimelech Gandelman Milgrom, Aventura, FL (US); Guy Rozenberg Kunievsky, Rehovot (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 77 days.

(21) Appl. No.: 18/132,519

(22) Filed: Apr. 10, 2023

(65) Prior Publication Data

US 2024/0340242 A1     Oct. 10, 2024

(51) Int. Cl.
*H04L 47/125*     (2022.01)

(52) U.S. Cl.
CPC .................................. *H04L 47/125* (2013.01)

(58) Field of Classification Search
CPC ..................................................... H04L 47/125
See application file for complete search history.

(56) References Cited

U.S. PATENT DOCUMENTS

| | | | |
|---|---|---|---|
| 4,965,788 A | 10/1990 | Newman | |
| 6,424,870 B1 * | 7/2002 | Maeda .................. | H04L 1/1835 |
| | | | 707/999.102 |
| 7,054,263 B1 | 5/2006 | Lindblom et al. | |
| 7,058,027 B1 * | 6/2006 | Alessi ................... | H04L 1/0068 |
| | | | 370/310.1 |
| 7,257,758 B1 | 8/2007 | Manula et al. | |
| 7,397,794 B1 * | 7/2008 | Lacroute ............... | H04L 49/115 |
| | | | 370/388 |
| 7,668,981 B1 | 2/2010 | Nagineni et al. | |
| 7,701,852 B1 * | 4/2010 | Hohn .................. | H04L 43/0858 |
| | | | 370/252 |
| 7,742,471 B2 * | 6/2010 | Sreejith .................. | H04L 45/00 |
| | | | 370/902 |
| 8,576,715 B2 * | 11/2013 | Bloch ...................... | H04L 45/38 |
| | | | 370/235 |
| 8,811,391 B2 * | 8/2014 | Lacroute ............... | H04L 49/118 |
| | | | 370/387 |
| 8,886,783 B2 | 11/2014 | Johnsen et al. | |
| 8,958,420 B1 | 2/2015 | Shekhar et al. | |
| 9,392,035 B1 * | 7/2016 | Jones ...................... | H04L 67/54 |
| 9,503,371 B2 * | 11/2016 | Thakkar .............. | H04L 49/3009 |
| 9,577,845 B2 * | 2/2017 | Thakkar ................ | H04L 45/7453 |
| 9,705,798 B1 * | 7/2017 | Abts ...................... | H04L 47/122 |
| 9,722,935 B2 * | 8/2017 | Bouanen ............. | H04L 47/2408 |

(Continued)

OTHER PUBLICATIONS

U.S. Appl. No. 18/073,662, filed Dec. 2, 2022, Bashan et al.

(Continued)

*Primary Examiner* — Abdelbasst Talioua
(74) *Attorney, Agent, or Firm* — Sheridan Ross P.C.

(57) ABSTRACT

A network device for load balancing in a multiplane network comprises a software stack that formats a data flow for transmission, and one or more circuits that identify the formatted data flow as a fixed data flow, and apply software-based load balancing to select a first plane, from among a plurality of planes of the multiplane network, for transmitting one or more data packets of the fixed data flow.

18 Claims, 10 Drawing Sheets

(56) References Cited

U.S. PATENT DOCUMENTS

| | | | | |
|---|---|---|---|---|
| 9,755,972 | B1* | 9/2017 | Mao | H04L 45/7453 |
| 9,871,712 | B1* | 1/2018 | Sorenson, III | H04L 43/10 |
| 10,103,992 | B1* | 10/2018 | Bshara | H04L 47/125 |
| 10,218,629 | B1* | 2/2019 | An | H04L 45/243 |
| 10,320,568 | B1* | 6/2019 | Mao | H04L 9/0894 |
| 10,382,396 | B2 | 8/2019 | Itkin et al. | |
| 10,567,288 | B1* | 2/2020 | Mutnuru | H04L 67/1019 |
| 10,624,148 | B1* | 4/2020 | Bainbridge | H04L 67/1036 |
| 10,812,576 | B1* | 10/2020 | Yuan | G06F 9/5077 |
| 10,938,626 | B2* | 3/2021 | Gupta | H04L 67/1031 |
| 11,411,869 | B1* | 8/2022 | Subagio | H04L 47/125 |
| 11,588,819 | B1* | 2/2023 | Wei | G06F 8/60 |
| 11,750,513 | B2 | 9/2023 | Bodanski et al. | |
| 11,895,015 | B1* | 2/2024 | Budhia | H04L 45/24 |
| 11,909,671 | B1 | 2/2024 | Chaves et al. | |
| 2002/0064336 | A1 | 5/2002 | Graves et al. | |
| 2003/0120852 | A1 | 6/2003 | McConnell et al. | |
| 2004/0001503 | A1 | 1/2004 | Manter | |
| 2004/0143593 | A1* | 7/2004 | Le Maut | H04L 49/552 |
| | | | | 707/999.102 |
| 2004/0213220 | A1 | 10/2004 | Davis | |
| 2005/0271073 | A1 | 12/2005 | Johnsen et al. | |
| 2005/0273641 | A1 | 12/2005 | Sandven et al. | |
| 2006/0006905 | A1 | 1/2006 | Chou et al. | |
| 2006/0116023 | A1 | 6/2006 | Spitaels et al. | |
| 2007/0223448 | A1* | 9/2007 | Tanazawa | H04L 45/60 |
| | | | | 370/351 |
| 2008/0101233 | A1* | 5/2008 | Shi | G06F 9/505 |
| | | | | 370/235 |
| 2009/0089793 | A1* | 4/2009 | Nandagopal | H04W 28/02 |
| | | | | 718/105 |
| 2010/0095064 | A1 | 4/2010 | Aviles | |
| 2010/0098089 | A1* | 4/2010 | Makino | H04L 45/028 |
| | | | | 370/395.31 |
| 2010/0115174 | A1* | 5/2010 | Akyol | G06F 13/385 |
| | | | | 710/316 |
| 2010/0310253 | A1* | 12/2010 | Kokje | H04L 49/3027 |
| | | | | 398/45 |
| 2011/0116443 | A1* | 5/2011 | Yu | H04L 12/413 |
| | | | | 370/328 |
| 2011/0228781 | A1* | 9/2011 | Izenberg | H04L 47/2441 |
| | | | | 370/392 |
| 2011/0228789 | A1 | 9/2011 | Jia | |
| 2013/0054947 | A1 | 2/2013 | Gavrilov | |
| 2013/0089089 | A1 | 4/2013 | Kamath et al. | |
| 2013/0142066 | A1* | 6/2013 | Yamaguchi | H04L 49/252 |
| | | | | 370/252 |
| 2013/0142197 | A1* | 6/2013 | Lacroute | H04L 49/111 |
| | | | | 370/386 |
| 2013/0275835 | A1 | 10/2013 | Aswadhati | |
| 2013/0347092 | A1 | 12/2013 | McBrearty et al. | |
| 2014/0016493 | A1* | 1/2014 | Johnsson | H04L 43/0864 |
| | | | | 370/252 |
| 2014/0078904 | A1* | 3/2014 | Yu | H04L 47/125 |
| | | | | 370/235 |
| 2014/0112338 | A1 | 4/2014 | Huang | |
| 2014/0177639 | A1 | 6/2014 | Vershkov et al. | |
| 2014/0211808 | A1 | 7/2014 | Koren et al. | |
| 2014/0301401 | A1 | 10/2014 | Wang et al. | |
| 2014/0310390 | A1* | 10/2014 | Sorenson, III | H04L 67/1023 |
| | | | | 709/223 |
| 2014/0321853 | A1* | 10/2014 | Beshai | H04Q 11/0062 |
| | | | | 398/52 |
| 2015/0172112 | A1 | 6/2015 | Itkin et al. | |
| 2015/0181317 | A1 | 6/2015 | Yin et al. | |
| 2015/0281102 | A1* | 10/2015 | Lee | H04L 47/621 |
| | | | | 370/236 |
| 2015/0295828 | A1* | 10/2015 | Lan | H04L 47/11 |
| | | | | 370/235 |
| 2015/0338909 | A1 | 11/2015 | Woodruff | |
| 2016/0127252 | A1* | 5/2016 | Tsirkin | G06F 9/45558 |
| | | | | 709/238 |
| 2017/0180264 | A1* | 6/2017 | Izenberg | H04L 45/60 |
| 2017/0195254 | A1* | 7/2017 | Pham | H04L 45/745 |
| 2017/0238362 | A1* | 8/2017 | Karandikar | H04W 48/18 |
| | | | | 370/328 |
| 2017/0264554 | A1* | 9/2017 | Contavalli | H04L 47/22 |
| 2017/0302525 | A1 | 10/2017 | Chen et al. | |
| 2017/0324681 | A1 | 11/2017 | Johnsen et al. | |
| 2018/0183758 | A1 | 6/2018 | Itkin et al. | |
| 2019/0007346 | A1 | 1/2019 | Johnsen et al. | |
| 2019/0012278 | A1 | 1/2019 | Sindu et al. | |
| 2019/0079897 | A1 | 3/2019 | Kochevar-Cureton et al. | |
| 2019/0141169 | A1* | 5/2019 | Ni | H04W 76/12 |
| 2019/0182180 | A1* | 6/2019 | Frankel | H04L 47/12 |
| 2019/0190777 | A1 | 6/2019 | Uchizumi et al. | |
| 2019/0190833 | A1* | 6/2019 | Georgios | H04L 47/125 |
| 2019/0245751 | A1* | 8/2019 | Wong | H04L 45/122 |
| 2019/0334792 | A1* | 10/2019 | Ayandeh | H04L 43/04 |
| 2019/0379594 | A1 | 12/2019 | Johnsen et al. | |
| 2020/0092122 | A1* | 3/2020 | Mishra | H04L 12/1859 |
| 2020/0104275 | A1 | 4/2020 | Sen et al. | |
| 2020/0136999 | A1* | 4/2020 | Levy-Abegnoli | H04L 49/25 |
| 2020/0159568 | A1 | 5/2020 | Goyal et al. | |
| 2020/0296057 | A1* | 9/2020 | Mula | H04L 47/6275 |
| 2020/0371828 | A1 | 11/2020 | Chiou et al. | |
| 2020/0371880 | A1* | 11/2020 | Aibester | H04L 43/12 |
| 2020/0382426 | A1* | 12/2020 | Li | H04L 47/283 |
| 2021/0019066 | A1* | 1/2021 | Li | G06F 3/0608 |
| 2021/0051115 | A1* | 2/2021 | Annamary | H04L 45/245 |
| 2021/0105659 | A1* | 4/2021 | Li | H04L 47/283 |
| 2021/0135993 | A1* | 5/2021 | Mittal | H04L 45/24 |
| 2021/0152494 | A1 | 5/2021 | Johnsen et al. | |
| 2021/0160169 | A1* | 5/2021 | Shen | H04L 45/02 |
| 2021/0176182 | A1* | 6/2021 | Yuan | H04L 43/0852 |
| 2021/0176543 | A1* | 6/2021 | Bakopoulos | H04Q 11/0005 |
| 2021/0211937 | A1* | 7/2021 | Qu | H04L 1/1642 |
| 2021/0263866 | A1 | 8/2021 | Norman et al. | |
| 2021/0288921 | A1* | 9/2021 | Levy | H04L 49/1515 |
| 2021/0328930 | A1* | 10/2021 | Nikolaidis | H04L 47/115 |
| 2021/0336895 | A1* | 10/2021 | He | H04L 47/30 |
| 2021/0367850 | A1* | 11/2021 | Gafni | H04L 49/65 |
| 2022/0124036 | A1 | 4/2022 | Yan et al. | |
| 2022/0150105 | A1* | 5/2022 | Thubert | H04L 41/12 |
| 2022/0182309 | A1* | 6/2022 | Bataineh | H04L 47/781 |
| 2022/0191127 | A1* | 6/2022 | Kopser | G06F 13/385 |
| 2022/0200933 | A1* | 6/2022 | Dutta | H04L 69/22 |
| 2022/0217092 | A1* | 7/2022 | Hou | H04L 47/2483 |
| 2022/0245522 | A1 | 8/2022 | Ramachandran et al. | |
| 2022/0255847 | A1* | 8/2022 | Xie | H04L 45/566 |
| 2022/0286902 | A1* | 9/2022 | Gao | H04W 24/06 |
| 2022/0294737 | A1* | 9/2022 | Dutta | H04L 45/12 |
| 2022/0335563 | A1 | 10/2022 | Elzur | |
| 2022/0353197 | A1* | 11/2022 | Singh | H04L 47/625 |
| 2022/0385561 | A1* | 12/2022 | Petrov | H04L 45/021 |
| 2022/0385579 | A1* | 12/2022 | Rangel Augusto | H04L 47/125 |
| 2023/0013110 | A1* | 1/2023 | Singh | H04L 49/1523 |
| 2023/0082780 | A1* | 3/2023 | Sun | G06F 9/505 |
| | | | | 718/105 |
| 2023/0106425 | A1* | 4/2023 | Lu | H04L 45/566 |
| | | | | 709/238 |

OTHER PUBLICATIONS

U.S. Appl. No. 18/114,860, filed Feb. 27, 2023, Levi et al.
U.S. Appl. No. 18/120,822, filed Mar. 13, 2023, Menes et al.
U.S. Appl. No. 18/200,443, filed May 22, 2023, Eran et al.

* cited by examiner

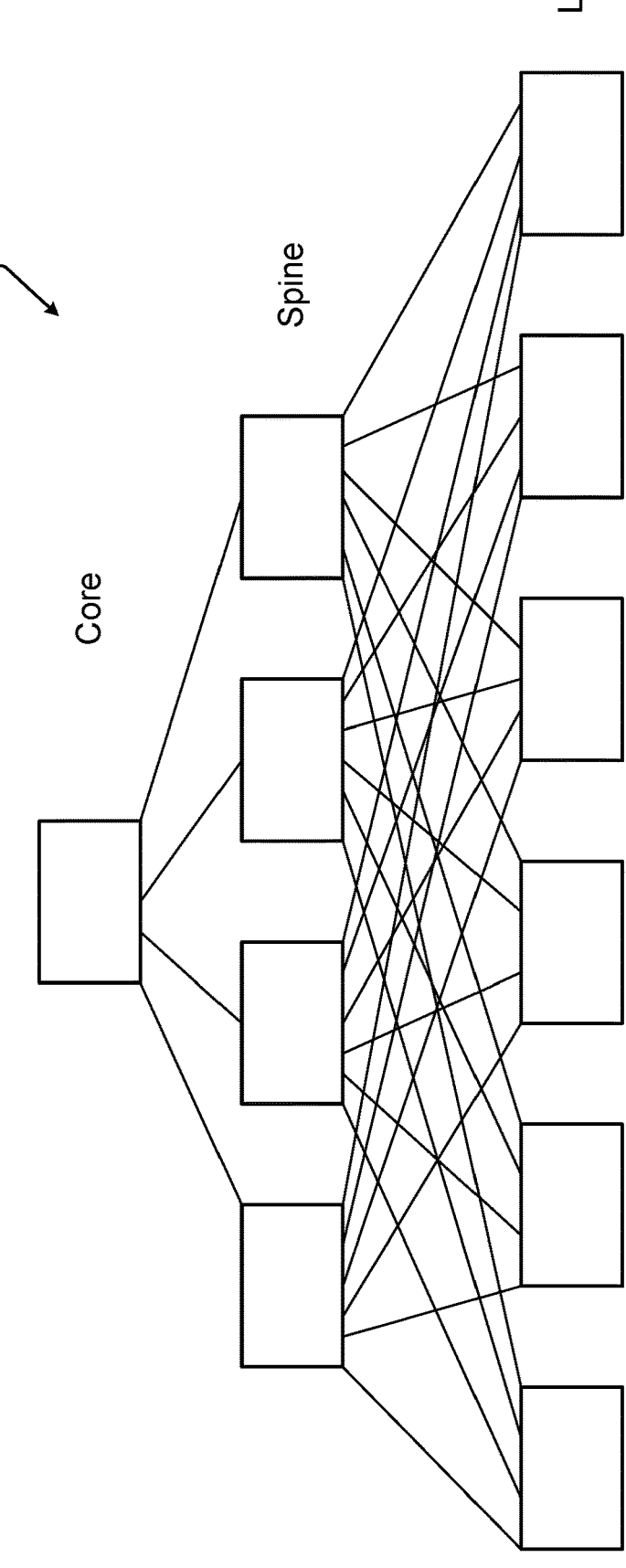
*Fig. 2*

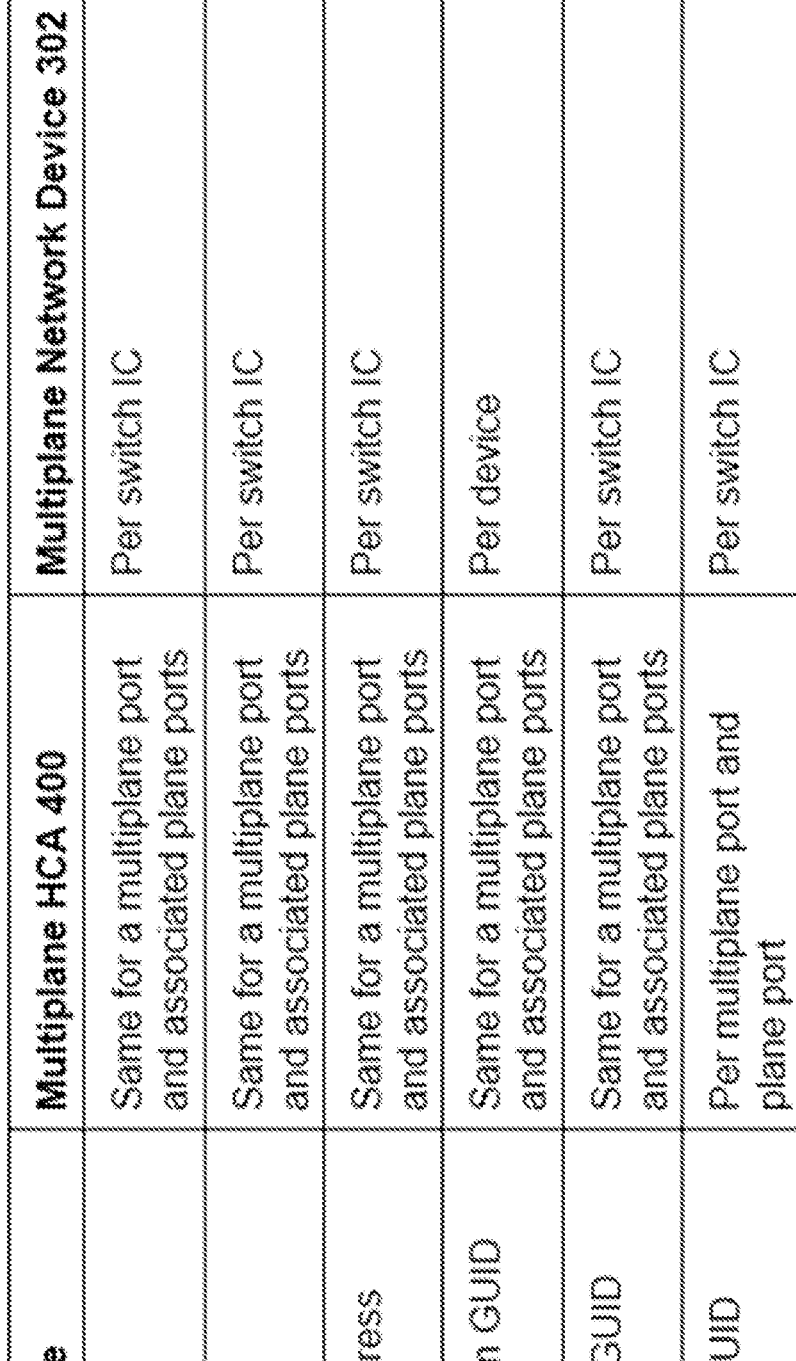

| ID type | Multiplane HCA 400 | Multiplane Network Device 302 |
|---|---|---|
| LID | Same for a multiplane port and associated plane ports | Per switch IC |
| GID | Same for a multiplane port and associated plane ports | Per switch IC |
| IP address | Same for a multiplane port and associated plane ports | Per switch IC |
| System GUID | Same for a multiplane port and associated plane ports | Per device |
| Node GUID | Same for a multiplane port and associated plane ports | Per switch IC |
| Port GUID | Per multiplane port and plane port | Per switch IC |

*Fig. 5*

MULTIPLANE LOAD BALANCING

FIELD OF THE DISCLOSURE

The present disclosure is generally directed to systems, methods, and devices for load balancing in multiplane networks.

BACKGROUND

Network switches are used in networking systems, like datacenters, for routing data between endpoints. High performance computing (HPC) networks demand switches with higher bandwidth and radix while maintaining low latencies.

BRIEF SUMMARY

In an illustrative embodiment, a network device for load balancing in a multiplane network comprises a software stack that formats a data flow for transmission, and one or more circuits that identify the formatted data flow as a fixed data flow, and apply software-based load balancing to select a first plane, from among a plurality of planes of the multiplane network, for transmitting one or more data packets of the fixed data flow. In some examples, the software-based load balancing includes selecting the first plane based on load statuses of the plurality of planes, and placing the one or more data packets into a first send queue associated with the first plane. In some examples, the load statuses of the plurality of planes are determined based on a number of fixed flows assigned to each plane. Each of the plurality of planes may have a corresponding send queue. In some examples, the software stack is not aware of the plurality of planes, and the one or more circuits are aware of the plurality of planes. The one or more circuits may identify the formatted data flow as a non-fixed data flow and send one or more data packets of the non-fixed data flow without applying the software-based load balancing. The fixed data flow may comprise a Transmission Control Protocol (TCP) transmission, and the non-fixed data flow may comprise a Remote Direct Access Memory (RDMA) transmission or a User Datagram Protocol (UDP) transmission. In some examples, the one or more circuits apply the software-based load balancing in response to determining that an amount of time during which data packets are not queued for transmission is greater than a threshold amount of time. In some examples, the software-based load balancing includes draining a send queue of the first plane, and placing the one or more data packets into a send queue of a different plane. The one or more data packets may be placed into the send queue of the different plane in response to an acknowledgement indicating that the send queue of the first plane is drained. In some examples, the software stack comprises a TCP stack. In some examples, the software stack comprises a multicast application for sending the data flow as a multicast transmission. The plurality of planes may be visible to the multicast application. The multicast application may select the first plane, from among the plurality of planes, based on load statuses of the plurality of planes, and place the one or more data packets into a send queue associated with the first plane.

In another illustrative embodiment, a networking system comprises a plurality of switches implementing a multiplane network comprising a plurality of planes, and a network device for load balancing transmissions over the multiplane network. The network device includes a software stack that formats a data flow for transmission, and one or more circuits that identify the formatted data flow as a fixed data flow, and apply software-based load balancing to select a first plane, from among the plurality of planes of the multiplane network, for transmitting one or more data packets of the fixed data flow. The software-based load balancing may include selecting the first plane, from among the plurality of planes, based on load statuses of the plurality of planes, and placing the one or more data packets into a first send queue associated with the first plane. Each of the plurality of planes may have a corresponding send queue. In some examples, the one or more circuits identify the formatted data flow as a non-fixed data flow and send one or more data packets of the non-fixed data flow without applying the software-based load balancing. In some examples, the one or more circuits apply the software-based load balancing in response to determining that an amount of time during which data packets are not queued for transmission is greater than a threshold amount of time.

In another illustrative embodiment, a network device for load balancing in a multiplane network comprises a software stack that formats a data flow for transmission, and one or more circuits that identify whether the formatted data flow is a fixed data flow or a non-fixed data flow, apply software-based routing to select a first plane, from among a plurality of planes of the multiplane network, for transmitting the fixed data flow, and apply hardware-based routing to transmit the non-fixed data flow over the multiplane network.

It should be appreciated that inventive concepts cover any embodiment in combination with any one or more other embodiments, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Additional features and advantages are described herein and will be apparent from the following description and the figures.

BRIEF DESCRIPTION OF THE DRAWINGS

The present disclosure is described in conjunction with the appended figures, which are not necessarily drawn to scale:

FIG. 2 illustrates a networking topology according to at least one example embodiment.

FIG. 5 illustrates a table showing how various identification (ID) types are assigned within a multiplane network according to at least one example embodiment.

DETAILED DESCRIPTION

Figure 1:
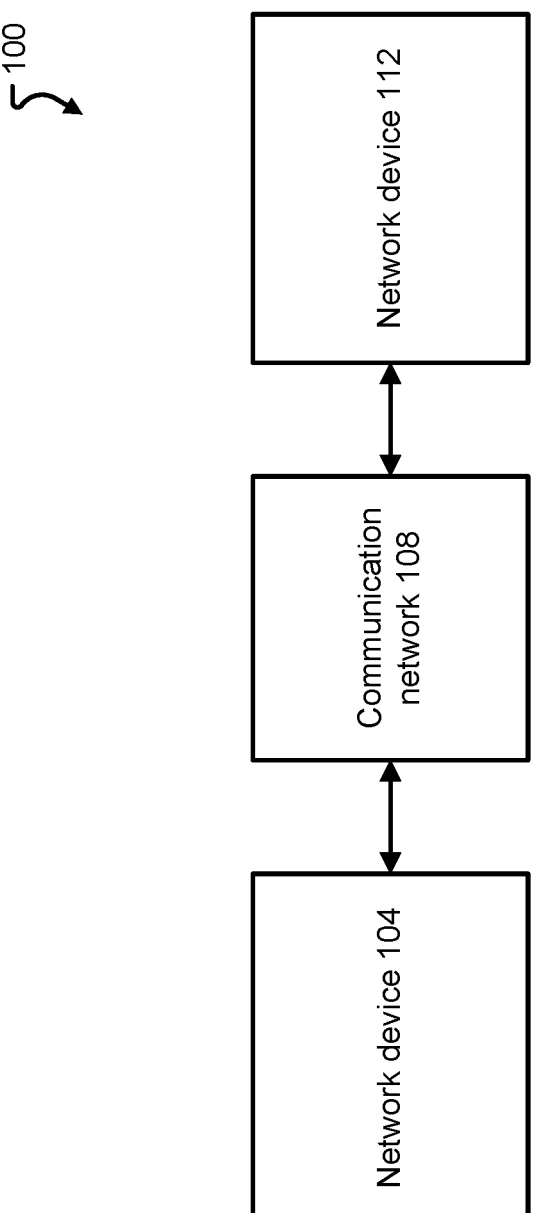
FIG. 1 illustrates a block diagram of a networking system according to at least one example embodiment.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C" "A, B, and/or C," and "A, B, or C" means A alone, B alone, C alone, A and B together, A and C together, B and C together, or A, B and C together.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Throughout the instant description, a switch integrated circuit (IC) should generally be understood to comprise switching hardware, such as an application specific integrated circuit (ASIC) that has switching capabilities. Multiplane network devices and non-multiplane network devices used in multiplane networks described herein may each include a single switch IC or multiple switch ICs.

A multiplane network (also called a planarized network or planarization or the like) may be implemented by dividing the switching fabric of a traditional communication network into multiple planes. For example, a related art, non-multiplane network switch for HPC systems may include a single high-bandwidth switch IC that is managed on a per-switch IC basis along with other high-bandwidth switches in the same network switch or in other network switches of the switching fabric.

A multiplane network switch, however, is a network switch having multiple smaller-bandwidth switch ICs that, when taken collectively, have an aggregated bandwidth equal to the single high-bandwidth switch IC of the related art. According to inventive concepts, multiplane network switches of a switching fabric are managed by a centralized controller, such as a software-defined network (SDN) controller. Controllers of related art non-multiplane network switches manage each physical interface (e.g., each port of switch IC) of the network device as an individual entity. Meanwhile, an SDN controller of a multiplane network manages the multiple smaller bandwidth switch ICs of a multiplane network switch as a single logical entity. In addition, the multiple smaller bandwidth switch ICs of a multiplane network switch are not visible to the user (e.g., the multiple switch ICs are not exposed to an application programming interface (API) that enables user interaction with the network so that applications can use the network without being aware of the planes). Stated another way, the system is constructed such that applications perceive the multiple smaller bandwidth switch ICs of a multiplane network device as a single, larger bandwidth switch IC. Challenges associated with multiplane networks include how the SDN controller configures and monitors the fabric to assign addresses, receive telemetry data, calculate routing algorithms, and the like, all while maintaining low latencies.

In addition to the above challenges at each multiplane network device routing traffic, other challenges arise at the host end. In one non-limiting implementation involving host channel adapters (HCAs), planarization introduces challenges associated with configuring and controlling multiple HCA physical ports to behave as a single network entity. Another challenge for an HCA or NIC of a multiplane network is related to load balancing traffic between the planes. In a multiplane network, a multiplane HCA/NIC may include a logically created multiplane port associated with multiple physical plane ports aggregated toward the network. The physical plane ports of an HCA may be connected to intervening switches between the HCA and the multiplane network switch(es), such as a single switch (e.g., a prism switch) or multiple switch ICs. Each plane port of an HCA may be configured with the same attributes (e.g., a same local identifier (LID), a same global identifier (GID)) by firmware of the HCA.

An SDN controller may configure switches of the fabric and HCAs to achieve consistent or similar performance across the multiple planes. The SDN controller may accomplish this by enforcing the same policies across multiple components, which appears to the user as a single interface. For example, a multiplane network may have same or similar routing decisions made across the planes and/or enforce symmetry across the planes to account for failed or non-existent connections. A multiplane network may use a same address (e.g., IP address) for multiple physical ports of an HCA. In another example, a multiplane network may enforce the same or similar transmission parameters (e.g., maximum transmission unit (MTU) size, speed, bandwidth, number of virtual lanes) across the planes of the network. A multiplane network may additionally use the same or similar routing tables for the planes of the network, enforce symmetry across the planes of the network in the event of a failure, and facilitate alignment between a tenant user and a network administrator.

Inventive concepts generally relate to multiplanar solutions for load balancing traffic to/from an endpoint, such as an HCA. Within multiplane networks, the HCA may assume the role of load balancing traffic among the different planes. A loading imbalance can adversely affect the network performance by increasing flow completion times, queuing latency, and the amount of packet reordering. The load balancing at an HCA may comprise software-based load balancing and hardware-based load balancing. Software-based load balancing is appropriate where software has better knowledge about the flows being transmitted and/or when software can divide the traffic on-demand or dynamically. Software-based load balancing includes employing a software component, such as a plane-aware driver of the HCA, that has knowledge about characteristics of the multiplane network that are then used to select a plane of the multiplane network for transmission of a data flow including. Hardware-based load balancing may refer to the notion of transmitting a data flow over a predetermined or preprogrammed plane(s) of the multiplane network (e.g., as indicated in a header of a data flow and processed by a hardware controller of the HCA).

According to inventive concepts, software of the HCA controls the plane used for each packet transmission and balances the load among the planes. The software knows whether a data flow has outstanding packets and can decide when to migrate the data flow to a different plane to eliminate or reduce packet reorderings. The software may even fence a data flow to clear the data flow preemptively for migration. The software may have high-level knowledge about the traffic pattern and can split the traffic deterministically among the planes without relying on randomness, per-flow entropy information, and/or the HCA's dynamic state.

The increased decision flexibility associated with software-based load balancing may be useful for fixed data flows, which are data flows that do not support out-of-order (OOO) delivery. An example of a fixed data flow is a Transmission Control Protocol (TCP) transmissions. Such software-based load balancing may increase network performance by reducing head-of-line (HOL) blocking as a result of migrating data flows between the planes when appropriate. Meanwhile, hardware-based load balancing may be useful for non-fixed data flows, which are data flows that support OOO delivery. Examples of non-fixed data flows include a Remote Direct Access Memory (RDMA) transmission and a User Datagram Protocol (UDP) transmission. However, it should be understood that some transmissions, such as UDP transmissions, may also be implemented as a fixed data flow that preserves packet ordering to, for example, improve performance. These features and other functions of a multiplane network are described in more detail below.

FIG. 1 illustrates a system 100 according to at least one example embodiment. The system 100 includes a network device 104, a communication network 108, and a network device 112. In at least one example embodiment, network devices 104 and 112 may correspond a network switch (e.g., an Ethernet switch), a collection of network switches, a network interface controller (NIC), an HCA, or any other suitable device used to process and traffic data between devices connected to communication network 108. Each network device 104 and 112 may be connected to one or more of a Personal Computer (PC), a laptop, a tablet, a smartphone, a server, a collection of servers, or the like. In one specific, but non-limiting example, a network device 104 and/or 112 includes an HCA described herein connected to a multiplane network switch that includes multiple smaller bandwidth switch ICs that are managed by a controller (e.g., an SDN controller) as a single logical entity.

Examples of the communication network 108 that may be used to connect the network devices 104 and 112 include an Internet Protocol (IP) network, an Ethernet network, an InfiniBand® (IB) network, a Fiber Channel network, the Internet, a cellular communication network, a wireless communication network, combinations thereof (e.g., Fibre Channel over Ethernet), variants thereof, and/or the like. In one specific, but non-limiting example, the communication network 108 comprises a switching fabric for routing traffic in a network that comprises multiplane network devices, non-multiplane network devices, and endpoints (e.g., HCAs and/or NICs connected to a host) using InfiniBand® and/or Ethernet technology. The network devices 104 and 112 may be considered separate from or part of such a switching fabric.

The network device 104 and/or the network device 112 may include storage devices and/or one or more circuits for carrying out computing tasks, for example, tasks associated with controlling the flow of data within each network device 104 and 112 and/or over the communication network 108. The one or more circuits may comprise software, hardware, or a combination thereof. For example, the one or more circuits may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the one or more circuits may comprise one or more hardware circuits, such as an application specific integrated circuit (ASIC). Other non-limiting examples of one or more circuits include an Integrated Circuit (IC) chip, a Central Processing Unit (CPU), a Graphics Processing Unit (GPU), a microprocessor, a Field Programmable Gate Array (FPGA), a collection of logic gates or transistors, resistors, capacitors, inductors, diodes, or the like. Some or all of the one or more circuits may be provided on a Printed Circuit Board (PCB) or collection of PCBs. It should be appreciated that any appropriate type of electrical component or collection of electrical components may be suitable for inclusion in the one or more circuits. The one or more circuits may execute functions associated with the network switches described herein (e.g., network switch 302), such as functions of the SDN controller 304. Additionally or alternatively, the one or more circuits may execute functions associated with the HCAs (e.g., HCA 400) described herein, such as functions associated with load balancing.

In addition, although not explicitly shown, it should be appreciated that the network devices 104 and 112 include one or more communication interfaces for facilitating wired and/or wireless communication between one another and other unillustrated elements of the system 100.

FIG. 2 illustrates a networking topology 200 according to at least one example embodiment. The topology 200 is a three tier topology with core, spine (or aggregation), and leaf (or access) layers. Each box of each layer represents a collection of network switches that is repeated for that layer. Although not explicitly shown, endpoints that comprise HCAs, servers and/or user terminals may be connected to the leaf layer. Here, it should be appreciated that example embodiments are not limited to the topology 200, and inventive concepts may be applied to other suitable network topologies (e.g., a two tier topology with spine and leaf layers). As discussed in more detail below, example embodiments relate to multiplane network switches and other multiplane network components which may be configured according to the topology 200.

Figure 3A:
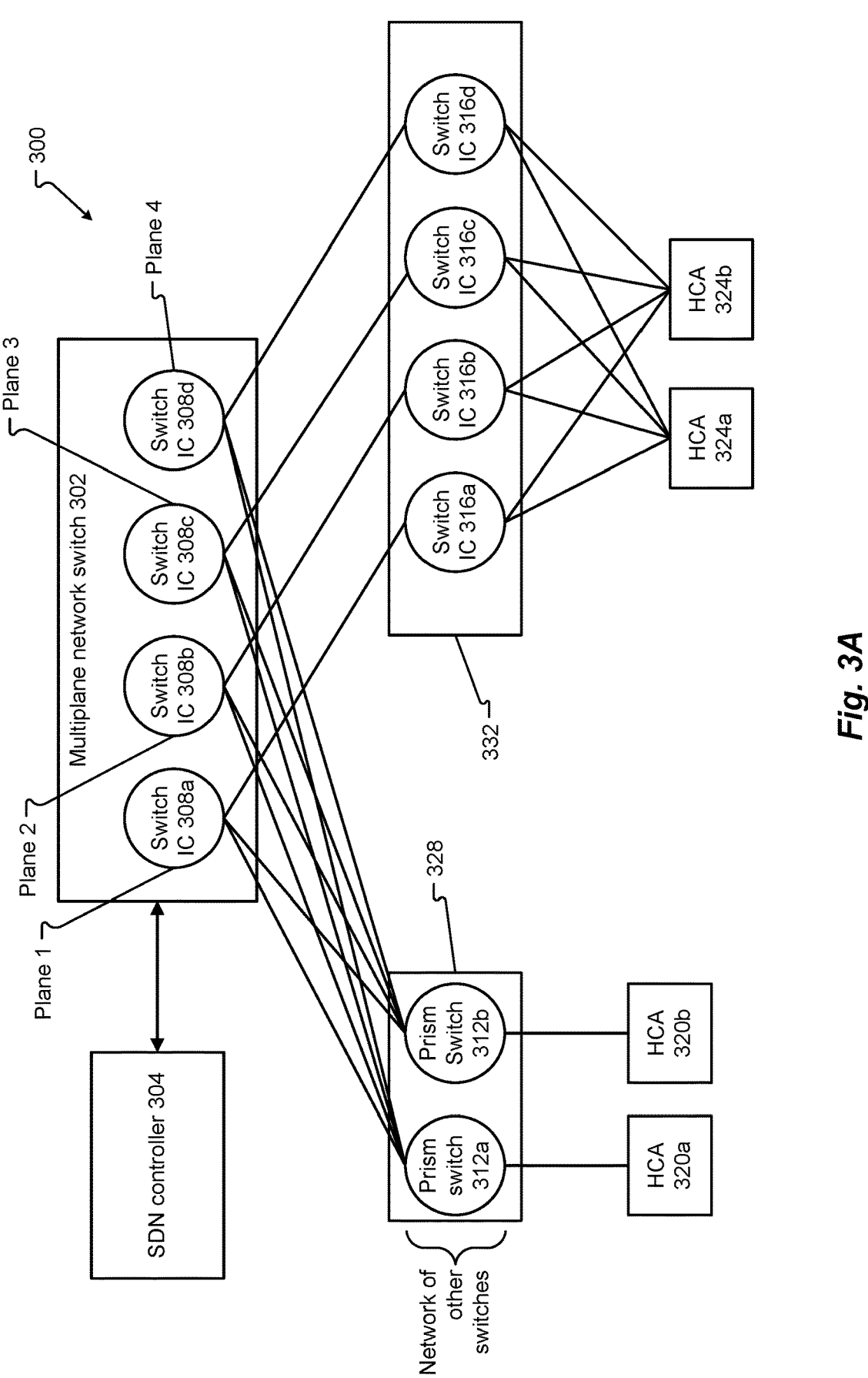
FIGS. 3A to 3C illustrate examples of a multiplane network according to at least one example embodiment.

FIG. 3A illustrates a multiplane network 300 according to at least one example embodiment. The multiplane network 300 may be included as part of the communication network 108 in FIG. 1. As shown in the example of FIG. 3A, the multiplane network 300 includes a multiplane network switch 302 with a plurality of switches 308, an SDN controller 304, a network of other switches including prism switches (or single-IC multiplane switches) 312a, 312b, and switch ICs 316a to 316d, and endpoints including host devices that are embodied in this example by HCAs 320a, 320b, and 324a to 324c. It should be appreciated that more or fewer of the elements illustrated in FIG. 3A may be included in the multiplane network 300. Throughout the instant description it should be appreciated that reference may be made to the root reference numeral of an element when reference to a specific element is not necessary (e.g., switch ICs 316a to 316d may be referred to as switch ICs 316).

The multiplane network switch 302 may be a non-limiting embodiment of a network device 104 and 112 in FIG. 1. In accordance with example embodiments, the multiplane network switch 302 includes a plurality of switches as switch ICs 308 each having a smaller bandwidth compared to related art devices with a single large bandwidth switch IC. For example, the multiplane network switch 302 may have a total bandwidth capability of 800 Gb/s formed by each switch IC 308 having a bandwidth of 200 Gb/s. In general, a multiplane network switch 302 routes traffic between endpoints, such as an HCA 320 and 324, through the network of other switches 312 and/or 324. As may be appreciated, each switch IC 308 corresponds to a different plane of the multiplane network 300. In FIG. 3A, the multiplane network 300 comprises four planes, one plane per switch IC 308a to 308d. Although FIG. 3A illustrates four switch ICs 308 (and four planes), it should be appreciated that a number of switch ICs 308 and the number of planes may be more or fewer (e.g., two switch ICs 308 and two planes). In any event, it should be appreciated that the switch ICs 308c are housed in a same housing, such as a housing of a network switch that mounts within a rack (e.g., a 32U rack).

As described herein, the SDN controller 304 may run one or more applications for controlling traffic in the multiplane network 300. The SDN controller 304 may be a standalone element in the network 300, part of the network switch 302, part of some other network element in the network 300, or any combination thereof. The SDN controller 304 may comprise one or more circuits for running the application(s) to manage the multiplane network 300. The one or more circuits of the SDN controller 304 should be understood to encompass the same or similar hardware and/or software as described above with reference network devices 104 and 112 in FIG. 1. For example, the SDN controller 304 manages the switch ICs 308 of the multiplane network switch 302 as a single logical entity when routing traffic through the network. Managing the switch ICs 308 as a single logical entity may be defined by the SDN controller 304 having the switch ICs 308 appear within the network 300 as a single large bandwidth switch IC instead of multiple smaller bandwidth switch ICs (e.g., the network switch 302 appears to a user or tenant as a single 800 Gb/s switch IC instead of four 200 Gb/s switch ICs 308). Stated another way, the underlying planes of the multiplane network 300 are visible to the SDN controller 304 but not to a user. Accordingly, it may be said that the SDN controller 304 is plane-aware while other components of the system are not plane-aware.

As shown in FIG. 3A, each plane (i.e., each switch IC 308) of the multiplane network switch 302 is connected to an endpoint HCA through a network of other switches, which may comprise prism switches 312 and/or switch ICs 316. A prism switch 312 may be capable of connecting a respective HCA 320 to each plane 1, 2, 3, and 4 through a respective switch IC 308a, b, c, and d. As such, a prism switch 312 may include mechanisms that enable switching between planes through a selection mechanism. For example, a prism switch 312 may comprise hardware and/or software to determine as associated plane for incoming packets. FIG. 3A illustrates an example where two prism switches 312a and 312b are included in a housing of a single network device 328, however, example embodiments are not limited thereto and more or fewer prism switches 312 may be included.

Like prism switches 312, switch ICs 316 may be housed in a single housing of a network device 332, and each switch IC 316 may comprise switching hardware (e.g., an ASIC) and be connected to a respective switch IC 308 through a respective plane. Furthermore, each switch 316 may be connected to an HCA 324.

As noted above, it may be said that the SDN controller 304 is plane-aware, which means that the SDN controller 304 is able to identify components specifically designed for the multiplane network 300. For example, the SDN controller 304 is able to distinguish multiplane HCAs from legacy HCAs and correlate between the different planes to reach a specific HCA which at least in part aided by the SDN controller 304 assigning a same NodeGUID to multiple plane ports of an HCA. The SDN controller 304 may also be able to construct a topology graph that correlates each HCA port in one plane to an equivalent port in each of the other planes. Still further, the plane-aware SDN controller 304 is capable of identifying plane cross locations where traffic is able to switch planes within a single device due to cross plane cabling and/or plane cross switches. In other words, the SDN controller 304 knows whether a network device 328 or 332 has the capability to internally route traffic on one plane to another plane (e.g., traffic received by switch IC 316a can be routed to switch IC 316b within the network device 332).

The multiplane network 300 may be operable in a symmetric mode and an asymmetric mode. The planes of the network 300 may be said to have symmetry in that i) every two nodes (e.g., nodes HCA 324a and 324b) are connected to each other through all planes or through no planes and ii) plane topology is the same for all planes. When operating in the symmetric mode, the SDN controller 304 enforces this symmetry over the life of the cluster by reflecting a link failure of one plane to the remaining planes, which maintains symmetry. Stated another way, the failure of a plane between two nodes is reflected to other nodes by not using or inactivating corresponding planes connecting the other nodes so that conditions i) and ii) above remain true. The symmetric mode reduces the complexity of balancing traffic between planes because all planes are assumed to be similar. The above described symmetry may be enforced by the SDN controller's 304 awareness of the planes and/or by other components, such as multiplane HCAs and/or multiplane switches that align the planes over time. Notably, symmetry in this context does not necessarily mean that all nodes (HCAs) have a same number of lanes since topology construction enables each node to be accessible from all available planes.

The above-described symmetrical mode of operation may require adjustments between planes to maintain or enforce symmetry over time. For example, the network 300 may align multiplane logical link states such that if a link between switches or between a switch and an HCA fails or is initiated, the other links are brought into alignment (e.g., activated or deactivated). The network 300 may maintain symmetry by aligning multiplane switches of the system such that if a switch IC fails or becomes active in a network device, the other switch ICs in that device are deactivated (in the event of a failure) or activated. The network 300 may also align multiplane HCAs so that if one plane of an HCA becomes active or inactive, other planes are activated or inactivated accordingly.

Figure 3B:
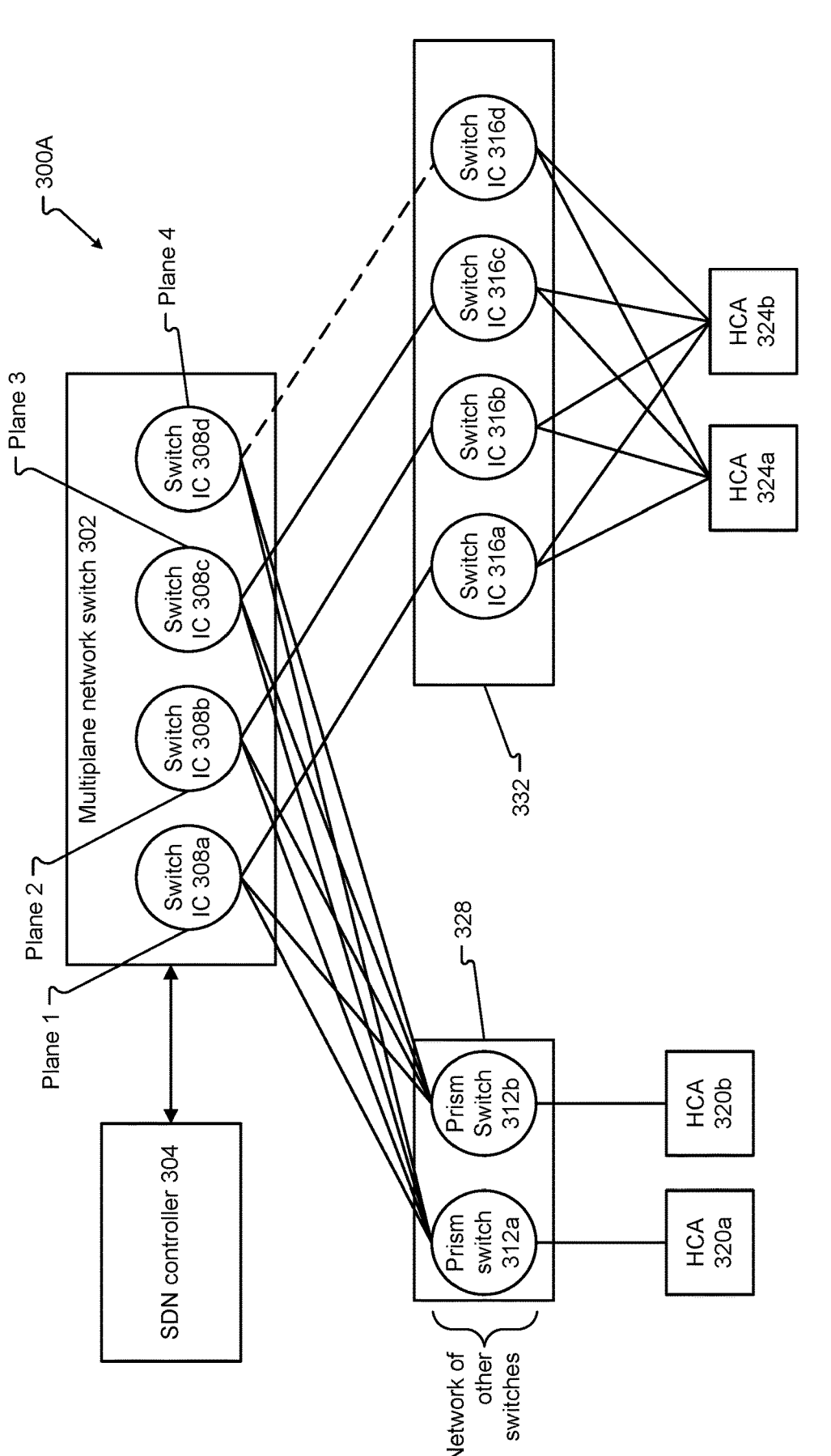
Figure 3C:
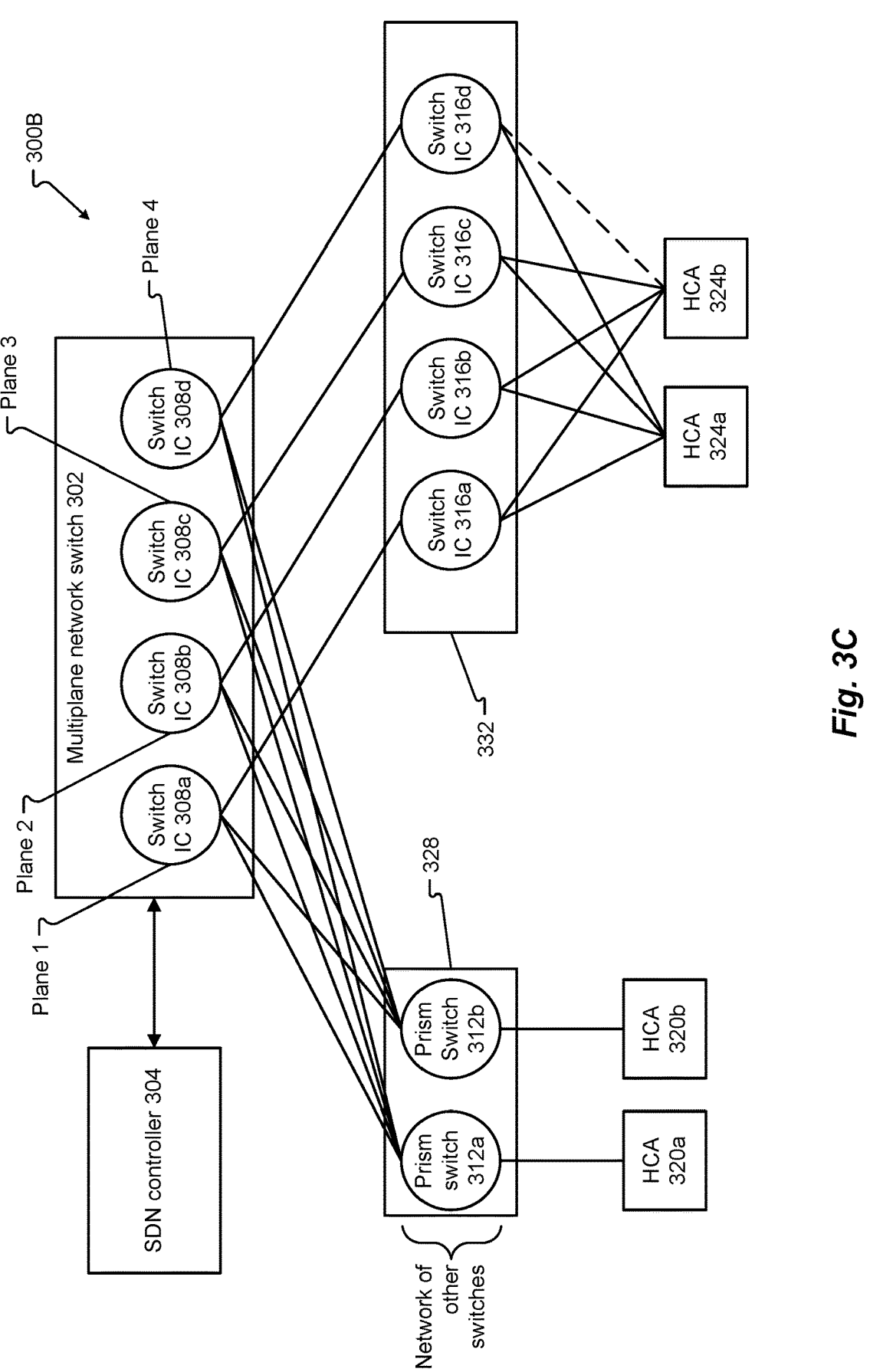

In some examples, the multiplane network 300 may be operated in an asymmetric mode where i) the plane topology is different upon initiation or changes over time, and/or ii) different planes provide different performance based on routing and structure. FIGS. 3B and 3C illustrate examples of asymmetric networks 300A and 300B, respectively. FIG. 3B illustrates an example of asymmetric switch connectivity in that plane number 4 has a failed or missing connection between switch IC 308*d* and switch IC 316*d* (illustrated with a dashed line). Meanwhile, FIG. 3C illustrates an example of asymmetric HCA connectivity in that HCA 324*b* is not connected to switch IC 316*d* (illustrated with a dashed line). The SDN controller 304 is aware of the asymmetry in the networks 300A and 300B and the asymmetry may affect forwarding decisions and load balancing between planes.

Figure 4:
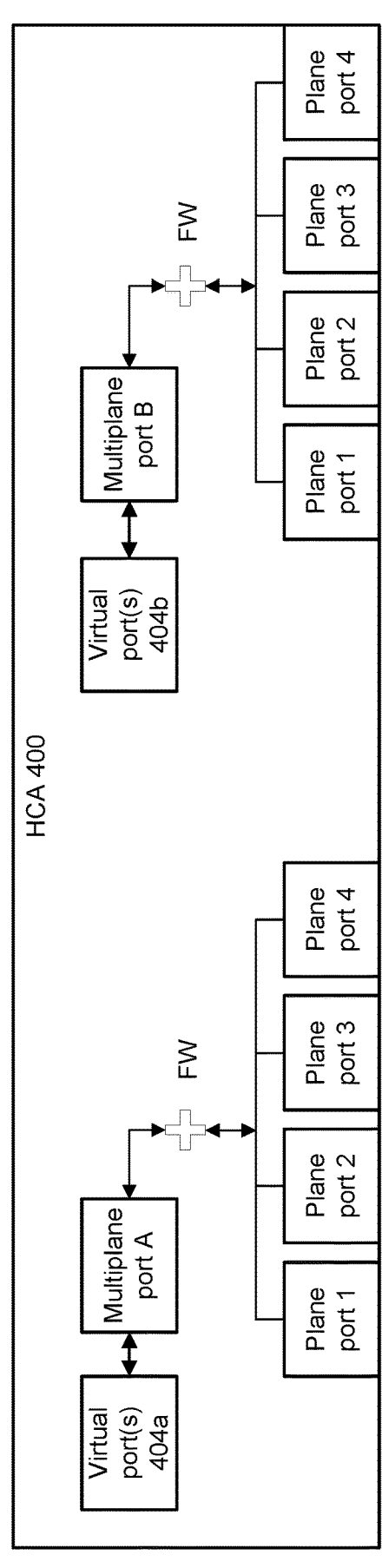
FIG. 4 illustrates an example structure of a multiplane HCA according to at least one example embodiment.

FIG. 4 illustrates an example structure of a multiplane HCA 400 according to at least one example embodiment. The HCAs described herein (e.g., in FIGS. 3A to 3C) may include multiplane HCAs 400. As noted above, an HCA may be an example of a network device 104 and/or 112 described herein. A multiplane HCA 400 may comprise one or more multiplane ports and one or more plane ports. Every multiplane port of a multiplane HCA 400 may be connected to N plane ports (where N is also the number of planes in a multiplanar network). In the example of FIG. 4, the multiplane ports A and B are each connected to or associated with respective plane ports 1 to 4. Here, it should be appreciated that the multiplane ports A and B are not physical ports, but are instead logically created by firmware FW of the HCA 400 for the respective planes. Each multiplane port A and B may be connected to one or more respective virtual ports 404*a* and 404*b* which each virtual port being assigned a function, such as a virtual remote direct memory access (RDMA) function.

Meanwhile, each plane port 1 to 4 may be associated with one of the planes 1 to 4 of the multiplane network 300. Each plane port corresponds to a single physical port of the HCA 400 that connects to a corresponding plane of the network 300. A multiplane HCA 400 may be identified with a node info attribute (e.g., a bit is added to a datagram, such as a Management Datagram (MAD) to specify the HCA as a multiplane HCA 400). Both the multiplane ports and the plane ports are represented as ports on the MAD layer, meaning each type of port answers to port info MAD and other port related MADs. Some of the MAD fields are configured per multiplane port only and affect the associated plane ports (such as QoS related fields)—those fields should be configured through the multiplane port. Meanwhile, other fields (such as error counters) remain relevant to the plane ports, and those fields are written individually to each plane port.

As may be appreciated, plane ports 1 to 4 associated with multiplane port A can access each other's MAD fields, but cannot access MAD fields of plane ports 1 to 4 associated with multiplane port B (and vice versa). Stated another way, data handled by plane ports 1 to 4 of multiplane port A cannot traverse to plane ports 1 to 4 of multiplane port B. As described in more detail herein, each multiplane port and plane ports associated with the multiplane port are assigned a single LID. Meanwhile, each plane port and each multiplane port of an HCA 400 is assigned a separate port GUID. The plane ports and multiple plane ports of an HCA 400 are assigned a single node GUID (because the GUID is used as a unique identifier in legacy HCAs).

Network discovery for a multiplane network 300 is the same as or similar to a non-planarized network. For example, the SDN controller 304 uses direct route functionality to obtain the full topology. The SDN controller 304 may further identify multiplane components (e.g., switches and HCAs). In one example, the SDN controller 304 receives the topology, GUIDs, and plane annotations to assist with discovering the network 300.

FIG. 5 illustrates a table 500 showing how various identification (ID) types are assigned within a multiplane network according to at least one example embodiment. The various ID types shown in FIG. 5 and discussed below may be associated with a particular type of network, such as an InfiniBand® network or an IP network. The various ID types may be assigned by the SDN controller 304, by firmware of an HCA, or other suitable source.

As shown, each multiplane port of an HCA 400 and plane ports associated to that multiplane port may be assigned a same LID, a same GID, a same IP address, a same system global unique identifier (GUID), and a same node GUID. Meanwhile, each multiplane port and each plane port of an HCA 400 may be assigned a different port GUID. As also shown in FIG. 5, each switch IC 308 of a multiplane network switch 302 may be assigned a different LID, a different GID, a different IP address, a different node GUID, and a different port GUID. On the other hand, each network switch 302 is assigned its own system GUID. The SDN controller 304 uses the various ID types in table 500 as part of managing the switch ICs 308 as a logical entity to route traffic within the network 300.

In view of the above discussion and associated figures, it should be appreciated that example embodiments provide a network switch 302 for implementing a multiplane network 300. The network switch 302 may include a plurality of switches 308 for routing traffic to an endpoint, such as an HCA 320*a*, through a network of other switches 312 and/or 316. Each switch 308 in the plurality of switches corresponds to a different plane of the multiplane network 300. The network device 320 may include or be in communication with an SDN controller 304 having one or more circuits that manages or controls the plurality of switches 308 as a single logical entity. For example, as described herein, the one or more circuits uses a same local identifier (LID) for a multiplane port and associated plane ports of the endpoint.

In some examples, the one or more circuits uses a same global identifier (GID) for a multiplane port and associated plane ports of the endpoint. In some examples, the one or more circuits uses a same IP address for a multiplane port and associated plane ports of the endpoint. In other examples, the one or more circuits uses a same node global unique identifier (GUID) for a multiplane port and associated plane ports of the endpoint. Still further, the one or more circuits uses a different port GUID for each multiplane port and each plane port of the endpoint. In at least one embodiment, the plurality of switches 308 route traffic according to InfiniBand® protocol or IP protocol. The one or more circuits enforces symmetry across the different planes of the multiplane network 300, which may be accomplished by reflecting a failure of one plane of the multiplane network 300 to remaining planes of the multiplane network 300. In some cases, the one or more circuits applies the same transmission parameters to the different planes of the multiplane network 300. Example transmission parameters comprise a maximum transmission unit (MTU), transmission bandwidth, number of virtual lanes, transmission speed, or any combination thereof. As noted herein, the one or more circuits identifies multiplane components within the multiplane network 300 using established discovery methods. In some cases, the one or more circuits applies a same or similar routing table to the different planes of the multiplane network 300.

In view of the above discussion and associated figures, it should be appreciated that example embodiments provide a system for implementing a multiplane network 300. The system may include a network switch 302 comprising a plurality of switches 308 for routing traffic to an endpoint (e.g., HCA 320a), where each switch in the plurality of switches corresponding to a different plane of the multiplane network 300. The system may further include a controller 304 that manages the plurality of switches 308 as a single logical entity a network of other switches 312/316 coupled to the plurality of switches 308 to route the traffic to the endpoint. In some examples, the controller 304 enforces symmetry by activating and inactivating the different planes of the multiplane network over time. For example, the controller 304 activates and inactivates the different planes to ensure that the endpoint (e.g., 320a) and another endpoint (e.g., 320b) are connected to each other by the network of switches on all the different planes or on none of the different planes.

As shown in FIG. 3A, for example, the plurality of switches comprises four switches 308a to 308d housed in a same housing, and wherein the network of other switches comprises a group of two switches 312a and 312b connected to the four switches of the plurality of switches or a group of four switches 316a to 316d connected to the four switches of the plurality of switches.

Figure 6:
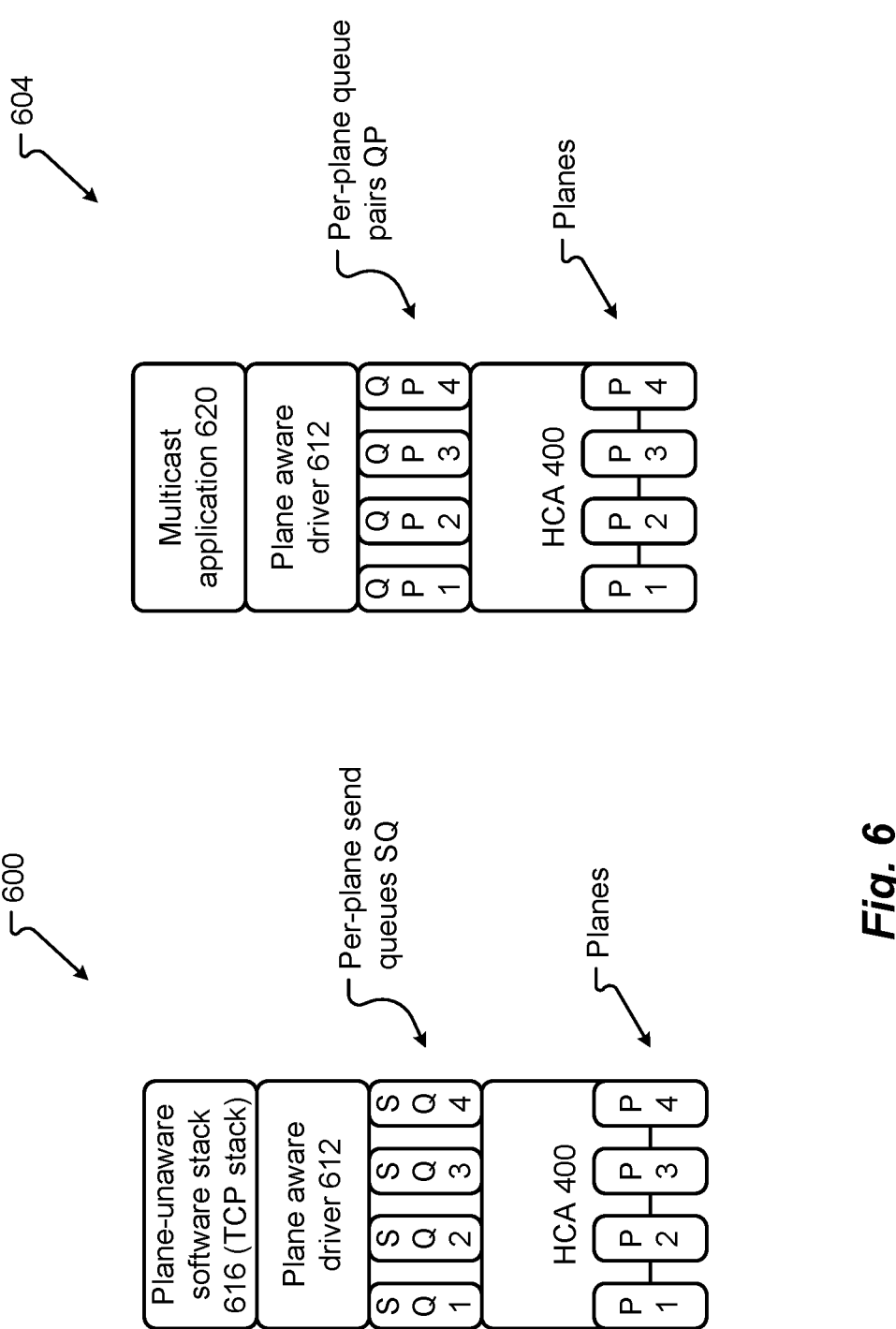
FIGS. 6 and 7 illustrate software models for achieving load balancing at an HCA according to at least one example embodiment.
Figure 7:
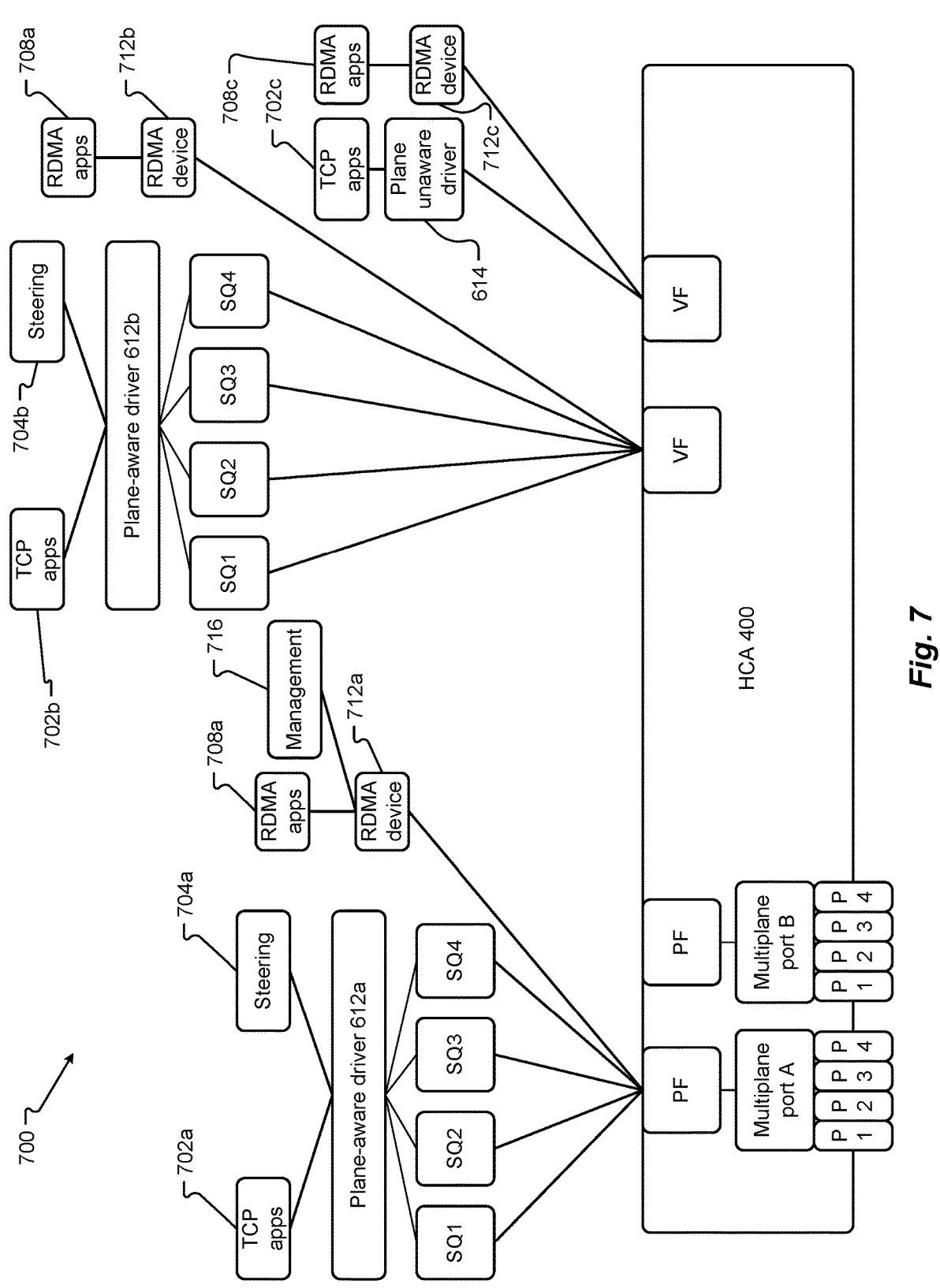

FIGS. 6 and 7 illustrate software models for achieving load balancing at an HCA 400 according to at least one example embodiment. In more detail, FIG. 6 illustrates example software models 600 and 604 for an HCA 400, with model 600 relating to TCP transmissions (e.g., TCP/IP transmissions), and with model 604 relating to multicast (MC) transmissions. Model 600 comprises a software stack 616, such as a TCP stack (e.g., a TCP/IP stack), a plane-aware driver 612 (e.g., implemented by software), per-plane send queues SQ1 to SQ4 for each plane P1 to P4 of, for example, a multiplane network 300. In accordance with example embodiments, the software stack 616 may be associated with one or more TCP applications and may assist with formatting data flows for transmission according to TCP protocols (e.g., as a TCP/IP transmission). Notably, the software stack 616 formats a data flow without awareness of the planes P1 to P4. Stated another way, the planes P1 to P4 of the multiplane network 300 are not exposed to the software stack 616 (e.g., via an application programming interface (API)). Instead, the software stack 616 sees a single plane having an aggregated bandwidth equal to the bandwidth of all planes taken together.

As shown, the model 600 comprises a plane-aware driver 612 that maintains awareness to the planes P1 to P4 (i.e., the planes P1 to P4 are exposed to the driver 612 and the driver knows which planes are active and inactive) to accomplish the software-based load balancing described herein. In some examples, the driver 612 creates a send queue SQ for each plane P. For example, SQ1 queues packets for transmission over P1, SQ2 queues packets for transmission over P2, SQ3 queues packets for transmission over P3, and SQ4 queues packets for transmission over P4 (recall that in FIG. 4, each plane P may be associated with a physical plane port). Again, the software stack 616 is not aware of the SQs and the driver 612 may handle the task of load balancing. Notably, each SQ is bound to a single plane P so that, for example, packets in SQ1 are transmitted over only its bounded plane P1, and cannot be transmitted over a different plane (e.g., P2, P3, and P4). In some examples, the driver 612 creates a receive queue RQ for each plane so that each plane has a corresponding queue pair QP as discussed below for the model 604. However, each RQ may receive packets from any plane P (i.e., an RQ is not bound to a particular plane like an SQ). In some examples, the driver 612 also handles the task of determining whether to apply software-based load balancing or routing or hardware-based load balancing or routing by determining whether a data flow is fixed (does not allow OOO delivery) or non-fixed (allows OOO delivery).

As may be appreciated, the model 600 described above may relate to unicast transmissions. Meanwhile, the model 604 relates to multicast transmissions over the planes P1 to P4. As shown, the model 604 comprises the same plane-aware driver 612 as the model 600, a software stack implemented here as a multicast application 620, and queue pairs QP1 to QP4 (each QP may include a send queue and receive queue). Unlike the software stack 616, the multicast application 620 may be aware of the planes P1 to P4 and perform at least some load-balancing functions by splitting a multicast transmission evenly over QP1 to QP4 (here, the load-balancing functions of the driver 612 may be disabled). In some examples, however, the multicast application 620 is not aware of the planes in the same manner as the software stack 616, and the driver 612 performs the load balancing functions for multicast transmissions from multicast application 620. In either case, the driver 612 may be plane-aware and creates a QP for each plane P. Each QP is bound to a particular plane P so that, for example, incoming/outgoing packets for QP1 are received/sent over only its bounded plane P1, and cannot be received/sent over a different plane (e.g., P2, P3, and P4). Although the model 604 relates specifically to multicast applications, it should be appreciated that other applications, such as applications that adhere to unicast protocols, may have a same or similar model and operate to split a transmission over QPs in the same manner as that described for model 604.

FIG. 7 illustrates a software model 700 for implementing a multiplane HCA 400 according to at least one example embodiment. The model 700 comprises a function-per-port, which may include a single physical function PF (e.g., a peripheral component interconnect express (PCIe) PF) for each of the physical ports associated with a multiplane port A or B (physical ports represented in FIG. 7 with planes P1 to P4). As shown, a single PF accesses a multiplane port A and all of the associated planes P1 to P4. Over this PF, a plane-aware driver 612a creates queues (e.g., SQs and/or QPs) that are bound to a specific plane (e.g., for load-balancing IPoIB or raw Ethernet traffic). As noted above, the queues are hidden from applications, such as the TCP apps 702a and 702b (including software stack 616) and/or RDMA apps 708a and 708b, which instead see a single netdev and a single RDMA device 712a or 712b. The RDMA device 712a may also handle management traffic. In addition, plane-aware drivers 612a and 612b may be subject to steering rules 704a and 704b. As shown in FIG. 7, a plane aware driver 612b may be employed on a VF of the HCA 400. As discussed, herein, RDMA traffic is an example of non-fixed flow traffic that may employ hardware-based load balancing.

Legacy drivers, such as plane-unaware driver 614, may also work on a virtual function VF of the HCA 400, and also expose a single netdev to TCP apps 702c and a single RDMA device 712c to the RDMA apps 708c.

As described herein, an HCA 400 may include one or more circuits that implement a plane-aware driver 612 to route traffic over the planes of a multiplane network with the assistance of software-based load balancing and/or hardware-based load balancing. As may be appreciated, some communications, such as TCP communications, rely on in-order delivery and, for these types of in-order fixed flow deliveries, the HCA 400 should disable adaptive routing (AR) whether the AR is software-based or hardware-based. On the other hand, an HCA 400 may employ hardware-based routing and/or load balancing for non-fixed data flows that allow OOO delivery.

Different transports, configurations, and drivers may use different mechanisms for plane selection. The HCA 400 may support at least the following mechanisms: 1) hardware congestion control: a congestion control algorithm which generates per-plane rates and takes the local AR information into account; 2) software control: the software (e.g., driver 612) classifies flows into planes and uses separate per-plane send queues (see FIG. 6), which is useful for TCP and Ethernet traffic to prevent head of line (HOL) blocking and to enable the software to migrate flows; 3) firmware control: firmware maintains a copy of a plane filter and can select the proper plane; 4) hash-based forwarding (HBF) where the transport layer (UD) hashes the address vector within a request to select a pseudo-random plane per-destination; and 5) a hardware plane-filter, which can provide authoritative indication for the planes for a given destination. Mechanism 2 above may be part of software-based load balancing and routing while mechanisms 1, 3, 4, and 5 may be part of hardware-based load balancing and routing.

MADs which use a direct route are transmitted on a specific plane, determined by information encoded within the packet. LID-routed MADs can be sent on any plane, relying on service ports within switch boxes to reach the correct switch IC even if transmitted on the "wrong" plane. Both the HCA's 400 firmware FW and the plane-aware driver 612 may be modified to support direct route, by creating four QPs, each bound to a separate plane (see model 604). LID-routed MADs can be sent on any of these QPs. Driver 612 may also create a QP per plane to balance the load among the planes. For receive, a single QP may receive from all planes. Plane-unaware driver 614 may create a single QP (or one per PKey) and have firmware bind that QP to an arbitrary plane.

In some cases, queues send packets that the network is allowed to reorder. In such cases, we can allow the hardware to select the plane using a plane-aware congestion control mechanism (e.g., mechanisms 1, 3, 4, or 5 above) and/or a local AR-like load-balancing mechanism. In some queues, OOO is supported only on some opcodes, and the decision on whether to use multiple planes is done per-operation.

In other cases, transport protocols expect the network to deliver packets in order. This can be a property of all packets in a queue, or of some packets in a queue. In these cases, applications may preserve packet order per-destination. Potential solutions include: 1) configure a default plane that will be used for in-order traffic in dynamically connected (DC) or reliably connected (RC) QPs—such traffic is limited to a single plane (e.g., at 200 Gbps); 2) software may create a QP per plane (e.g., for UD IPoIB or Raw Ethernet), and select queues for each data flow using a hash and/or software plane filter; 3) hash-based plane selection the same as or similar to mechanism 4 above (to prevent HOL blocking after the packet is fetched, this can be done for UD, which includes the address in the work queue element (WQE)); and 4) on-demand plane migration—which can help an unaware driver, but may cause thrashing and HOL blocking, as the unaware driver may cause the queue to migrate constantly. The on-demand migration solution may support an asymmetric topology, at a performance cost, but the queue-per plane solution for Raw Ethernet and IPoIB can support a plane filter in software. Unaware drivers can use a default plane, hash-based plane selection (if supported by hardware), or on-demand plane migration. IPoIB and Raw Ethernet unaware drivers can either use a single arbitrary plane per queue or migrate on demand.

As may be appreciated, steering rules 704a and 704b may change planes, and packets marked as AR in steering rules 704a and 704b do not use multiplane arbitration (packets marked AR are not subject to software-based load balancing). Constant data flows may be moved to different planes in real time to achieve better load balance.

Figure 8:
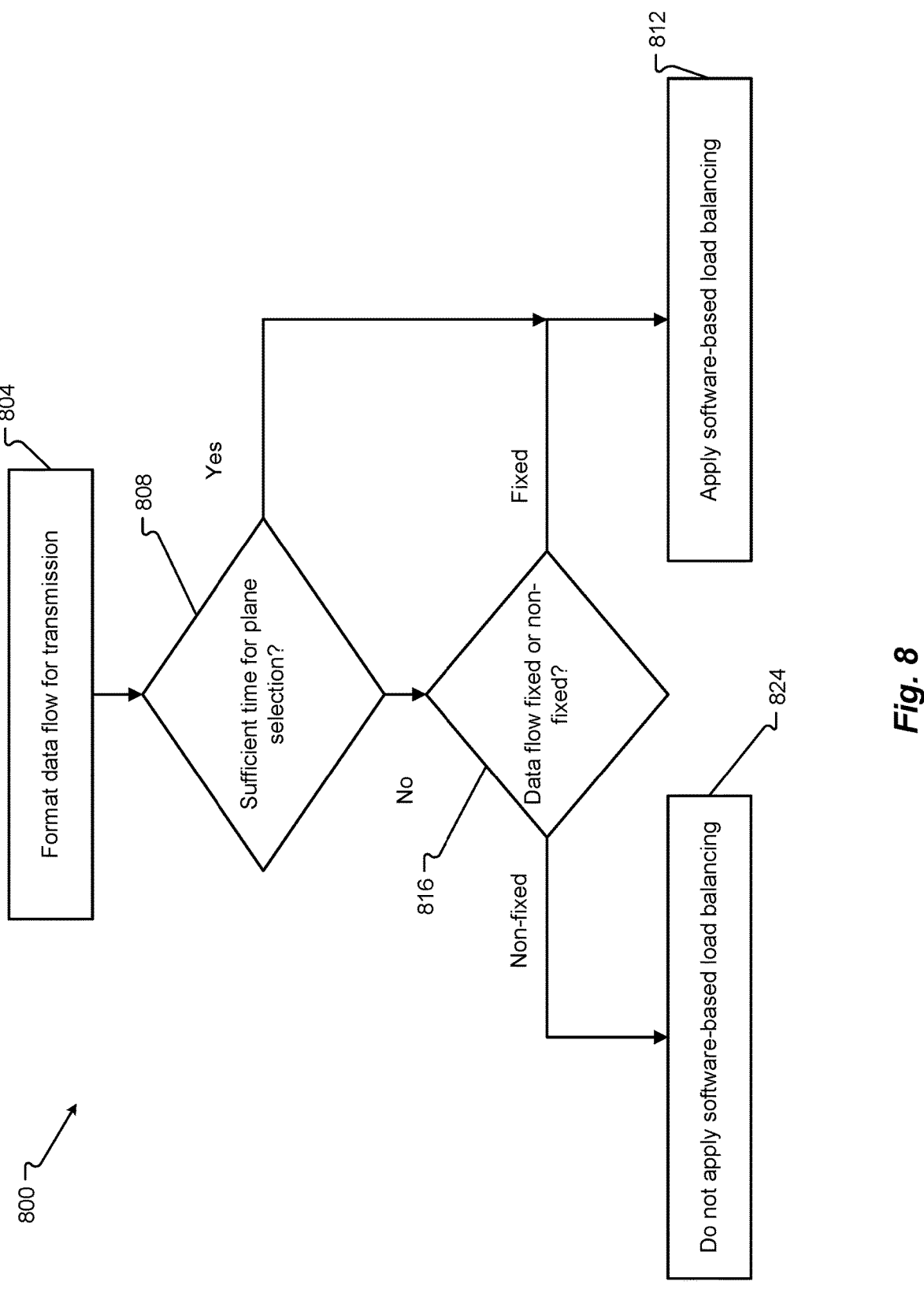
FIG. 8 illustrates a method for routing traffic within a multiplane network according to at least one example embodiment.

FIG. 8 illustrates a method 800 for routing traffic within a multiplane network 300 according to at least one example embodiment. While a general order for the steps of the method 800 is shown in FIG. 8, the method 800 can include more or fewer steps or can arrange the order of the steps differently than those shown in FIG. 8. The 800 may be executed by one or more circuits of an HCA 400 described herein (e.g., the processing circuits described with reference to FIG. 1, or a set of computer-executable instructions encoded or stored on a computer readable medium and executed by a processor of the HCA 400). Alternatively, the operations discussed with respect to FIG. 8 may be implemented by the various elements of the system(s) in FIGS. 1-7. Hereinafter, the method 800 is explained with reference to the systems, components, assemblies, devices, environments, software, etc. described in conjunction with FIGS. 1-7.

Operation 804 includes formatting a data flow for transmission from an HCA 400. For example, a software stack that is part of a TCP/IP application (e.g., a TCP app 702) or a multicast application (e.g., 620) may include software layers that format data packets of a data flow according to a particular protocol (e.g., TCP/IP, a multicast protocol, RDMA, and/or the like). As noted herein, the software stack may not be aware of the underlying planes P1 to P4 of a multiplane network 300.

Operation 808 includes determining whether there is sufficient time for allowing plane selection. For example, operation 808 may determine whether an amount of time between queued-up data packets of a data flow is longer than a threshold amount of time. In another example, operation 808 may determine whether an amount of time between separate data flows is longer than a threshold amount of time (where each separate data flow includes a set of data packets). The software stack may provide hints that enable a driver 612 to make the determination in operation 808. In any event, the threshold amount of time is a design parameter set based on empirical evidence and/or preference, and should correspond to an amount of time that would enable the HCA 400 to perform software-based load balancing to select planes on which to send one or more data packets of a data flow based on one or more factors, such as load statuses of the planes. At this stage, the method 800 is agnostic as to whether the data flow is a fixed data flow that does not allow OOO delivery or a non-fixed data flow that allows OOO delivery.

Here, it should be appreciated that operation 808 may be additionally (or alternatively) performed at a different time within the method 800, for example, between operations 816 and 812. In some examples, operation 808 is omitted from the method 800 so that the method 800 proceeds from operation 804 directly to operation 816. In this case, software-based load balancing and plane selection occurs only for fixed data flows.

If operation 808 determines that there is time for the HCA 400 to select a plane or planes for a data flow or packets of a data flow (i.e., determination is 'yes'), the method 800 proceeds to operation 812 and applies software-based load balancing to the data flow. As noted herein, software-based load balancing may include selecting a plane on which to transmit data packets of a data flow in a manner that balances loads on the planes to avoid network congestion issues, such as HOL blocking.

In general, software-based load balancing and routing refers to allowing the HCA's 400 driver and/or its applications to select planes for transmitting data packets of a data flow. Meanwhile, hardware-based load balancing or hardware-based routing does not necessarily allow for plane selection for a data flow, and instead, the data flow is routed through the network 300 without the plane selection process used for software-based load balancing. In some examples, software-based load balancing includes selecting a first plane P1 from the underlying planes based on load statuses of the planes, and placing one or more data packets of the data flow into a first send queue SQ1 associated with the first plane P1. In general, the goal of load-balancing is to have the traffic on each plane P1 to P4 be substantially equal and/or to match the capabilities of the planes. In one example then, the first plane P1 is selected as a result of determining that the first plane P1 is carrying less traffic than the other planes. In cases where the planes have different capabilities, then the goal of load-balancing may be to ensure that each plane is performing optimally according to its capabilities. In at least one other example, switching a data flow between planes may occur in response to determining that the one plane is experiencing higher levels of congestion than the other plane. In that case, the data flow may be migrated to the plane with less congestion, even if the plane experiencing increased congestion is relatively underutilized compared to the plane with less congestion.

In some examples, the load statuses of the plurality of planes are determined based on a number of fixed flows already assigned to each plane. In other examples, the load statuses may be measured by a number of buffers already in use or by traffic through a plane port over time. In yet other examples, the load statuses are tracked with counters, such as packet counters for specific planes focusing on fixed flows. In at least one embodiment, software-based load balancing includes draining a send queue SQ1 of the first plane P1, and placing the one or more data packets into a send queue SQ of a different plane. The one or more data packets may be placed into the send queue of the different plane in response to an acknowledgement from a receiver or destination. The acknowledgement indicates that data packets of a data flow being drained from SQ1 have been received by the receiver, which avoids accidental packet reordering when migrating other data packets of the same data flow to the send queue SQ of the different plane. Alternatively, the acknowledgement may be generated internal to the HCA to indicate completion of transmission of the data packets in SQ1 (where completion of transmission from a send queue does not necessarily mean the data packets were successfully received by the receiver and could still be traversing the network).

If the determination in operation 808 is 'no,' the method 800 proceeds to operation 816. Operation 816 determines whether the data flow is a fixed data flow or a non-fixed data flow. As noted herein, a fixed data flow may comprise TCP/IP transmission while a non-fixed data flow may comprise an RDMA transmission or a UDP transmission. A data flow may be identified as fixed or non-fixed based on its source (e.g., from a TCP app, RDMA app, etc.) and/or based on information contained within the data flow (e.g., header information that identifies the data flow as TCP, RDMA, UDP, etc.). For example, an application may specify type of data flow as fixed or non-fixed using metadata included with packets of the data flow. In the example of an RDMA transmission, the RDMA data flow may be identified as non-fixed with metadata provided by creating a QP and/or by the operations posted by the RDMA application.

If the data flow is a fixed data flow, the method 800 proceeds to operation 812 and applies the same software-based load balancing and plane selection process as described above for operation 812. If the data flow is a non-fixed data flow, the method 800 proceeds to operation 824 and does not attempt to apply software-based load balancing. Instead, the method 800 may proceed to transmit the data flow according to hardware-based load balancing or hardware-based routing methods described herein. In some examples, operation 824 includes queuing the data flow for transmission over a default plane which may be preset for the type of transmission (RDMA, UDP, etc.).

As noted above, operation 808 may be repeated or moved to between operations 816 and 812 such that, upon determining that the data flow is a fixed data flow, the method may then determine whether sufficient time exists for plane selection as in operation 808. If so, then proceed to operation 812, and if not, then proceed to operation 824.

Although example embodiments have been shown and described with respect to systems having specific types of elements and numbers of elements, it should be appreciated inventive concepts are not limited thereto and that fewer or more elements and/or different types of elements are within the scope of inventive concepts.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiments, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

What is claimed is:

1. A network device for load balancing in a multiplane network, comprising:
a software stack that formats a data flow for transmission; and
one or more circuits, including hardware, to:
identify the formatted data flow as either a non-fixed data flow that supports out-of-order packet delivery or as a fixed data flow that does not support out-of-order packet delivery; and
apply software-based load balancing when the formatted data flow is the fixed data flow, wherein applying the software-based load balancing includes:
determining that a first plane, from among a plurality of planes of the multiplane network, over which the fixed data flow is to be transmitted is experiencing congestion, wherein each plane of the plurality of planes is associated with a different switch integrated circuit (IC) of a plurality of switch integrated circuits (ICs) in a multiplane network switch connected to the network device;
in response to determining that the first plane is experiencing congestion, selecting a second plane from among the plurality of planes based on characteristics of the multiplane network;
draining a send queue of the first plane; and
migrating the fixed data flow from a first switch IC, associated with the first plane, in the plurality of switch ICs to a second switch IC, associated with the second plane, in the plurality of switch ICs to enable transmission of one or more data packets of the fixed data flow over the second plane, wherein the one or more data packets of the fixed data flow are placed into a send queue of the second plane in response to an acknowledgement indicating that the send queue of the first plane is drained; and
queue, when the formatted data flow is the non-fixed data flow, one or more data packets of the non-fixed data flow for transmission over a pre-programmed plane of the plurality of planes.

2. The network device of claim 1,
wherein the software-based load balancing includes:
selecting the second plane based on load statuses of the plurality of planes; and
placing the one or more data packets of the fixed data flow into the send queue associated with the second plane.

3. The network device of claim 2, wherein the load statuses of the plurality of planes are determined based on a number of fixed flows assigned to each plane.

4. The network device of claim 2, wherein each of the plurality of planes has a corresponding send queue.

5. The network device of claim 1, wherein the software stack is not aware of the plurality of planes, and wherein the one or more circuits are aware of the plurality of planes.

6. The network device of claim 1, wherein the characteristics of the multiplane network comprise a load status of the second plane.

7. The network device of claim 1, wherein the fixed data flow comprises a Transmission Control Protocol (TCP) transmission, and wherein the non-fixed data flow comprises a Remote Direct Memory Access (RDMA) transmission or a User Datagram Protocol (UDP) transmission.

8. The network device of claim 1, wherein the one or more circuits apply the software-based load balancing in response to determining that an amount of time during which data packets are not queued for transmission is greater than a threshold amount of time.

9. The network device of claim 1, wherein the software stack comprises a TCP stack.

10. The network device of claim 1, wherein the software stack comprises a multicast application for sending a multicast transmission.

11. The network device of claim 10, wherein the plurality of planes are visible to the multicast application.

12. The network device of claim 11, wherein the multicast application places one or more packets of the multicast transmission into a send queue associated with the pre-programmed plane.

13. A networking system, comprising:
a plurality of switches implementing a multiplane network comprising a plurality of planes;
a multiplane device including a number of physical ports and a logical port associated with the number of the physical ports, the number of the physical ports corresponding to a number of the plurality of planes; and
a network device for load balancing transmissions over the multiplane network, the network device including:
a software stack to format a data flow for transmission; and
one or more circuits, including hardware, to:
identify the formatted data flow as either a non-fixed data flow that supports out-of-order packet delivery or as a fixed data flow that does not support out-of-order packet delivery; and
apply software-based load balancing when the formatted data flow is the fixed data flow, wherein applying the software-based load balancing includes:
determining that a first plane, from among the plurality of planes of the multiplane network, over which the fixed data flow is to be transmitted is experiencing congestion, wherein each plane of the plurality of planes is associated with a different switch integrated circuit (IC) of a plurality of switch integrated circuits (ICs) in a multiplane network switch connected to the network device;
in response to determining that the first plane is experiencing congestion, selecting a second plane from among the plurality of planes based on characteristics of the multiplane network;
draining a send queue of the first plane; and migrating the fixed data flow from a first switch IC, associated with the first plane, in the plurality of switch ICs to a second switch IC, associated with the second plane, in the plurality of switch ICs to enable transmission of one or more data packets of the fixed data flow to the multiplane device over the second plane, wherein the one or more data packets of the fixed data flow are placed into a send queue of the second plane in response to an acknowledgement indicating that the send queue of the first plane is drained; and queue, when the formatted data flow is the non-fixed data flow, one or more packets of the non-fixed data flow for transmission to the multiplane device over a pre-programmed plane of the plurality of planes.

14. The networking system of claim 13, wherein the software-based load balancing includes:

selecting the second plane, from among the plurality of planes, based on load statuses of the plurality of planes; and placing the one or more data packets of the fixed data flow into the send queue associated with the second plane.

15. The networking system of claim 13, wherein each of the plurality of planes has a corresponding send queue.

16. The networking system of claim 13, wherein the characteristics of the multiplane network comprise a load status of the second plane.

17. The networking system of claim 13, wherein the one or more circuits apply the software-based load balancing in response to determining that an amount of time during which data packets are not queued for transmission is greater than a threshold amount of time.

18. A network device for load balancing in a multiplane network, comprising:

a software stack to format a data flow for transmission; and one or more circuits, including hardware, to:

identify whether the formatted data flow is either a non-fixed data flow that supports out-of-order packet delivery or a fixed data flow that does not support out-of-order packet delivery;

apply software-based load balancing when the formatted data flow is the fixed data flow, wherein applying the software-based load balancing includes:

determining that a first plane, from among a plurality of planes of the multiplane network, over which the fixed data flow is to be transmitted is experiencing congestion, wherein each plane of the plurality of planes is associated with a different switch integrated circuit (IC) of a plurality of switch integrated circuits (ICs) in a multiplane network switch connected to the network device;

in response to determining that the first plane is experiencing congestion, selecting a second plane from among the plurality of planes based on characteristics of the multiplane network;

draining a send queue of the first plane; and migrating the fixed data flow from a first switch IC, associated with the first plane, in the plurality of switch ICs to a second switch IC, associated with the second plane, in the plurality of switch ICs to enable transmission of one or more data packets of the fixed data flow over the second plane, wherein the one or more data packets of the fixed data flow are placed into a send queue of the second plane in response to an acknowledgement indicating that the send queue of the first plane is drained; and apply hardware-based routing when the formatted data flow is the non-fixed data flow to queue the non-fixed data flow for transmission over a pre-programmed plane of the plurality of planes.

* * * * *